Patented Mar. 24, 1953

2,632,739

UNITED STATES PATENT OFFICE 2,632,739

CATALYST FOR PRODUCING AROMATIC HYDROCARBONS

James A. Dinwiddie and Charles J. G. Leesemann, Baytown, Tex., assignors, by mesne assignments, to Standard Oil Development Company, Elizabeth, N. J., a corporation of Delaware No Drawing. Original application October 12, 1949, Serial No. 121,064. Divided and this application May 16, 1950, Serial No. 162,384

10 Claims. (Cl. 252—465)

The present invention is directed to a catalytic process for producing aromatic hydrocarbons. A saturated hydrocarbon having at least 6 carbon atoms in the molecule at a temperature within the range of 800° to 1300° F. and at a pressure within the range from 0 to 500 p. s. i. g. is contacted with a supported catalyst comprising a molybdate of a metal selected from the left-hand column of group II of the periodic table to which has been added a promotional quantity of a compound selected from the oxide, hydroxide and salts of potassium to form an aromatic product.

This application is a division of U. S. Serial No. 121,064, filed October 12, 1949, for James A. Dinwiddie and Charles J. G. Leesemann and entitled "Method for Preparing Aromatic Hydrocarbons."

Prior to the present invention, it has been well known to aromatize paraffinic hydrocarbons by subjecting paraffinic hydrocarbons at suitable temperatures and pressure to contact with so-called aromatization catalysts which usually have been oxides or sulfides of the metals selected from group VI of the periodic table. The oxides and sulfides have been used on supports such as alumina. The aromatization of hydrocarbons is usually conducted at relatively low pressures below about 100 pounds per square inch and may be conducted either in the presence or in the absence of hydrogen. On the other hand, hydroforming, or catalytic conversion of naphthenes, is always conducted in the presence of hydrogen and should be understood to means a process of catalytic reforming carried out in the presence of added or recirculated hydrogen or gases containing hydrogen under such conditions that there is no overall net consumption of free hydrogen or there is an overall net production of free hydrogen. The hydroforming process employs the same type of catalyst in the prior art process as does the aromatization process, the difference being, as mentioned before, that in aromatization the paraffins are cyclized, whereas in hydroforming the naphthenes are dehydrogenated.

The present invention is directed to a process in which either a hydroforming or an aromatization reaction prevails or both, depending on whether the feed stock comprises paraffinic and/or naphthenic hydrocarbons.

The prior art processes employing the catalysts as mentioned before, selected from group VI of the periodic table, have produced substantial quantities of useful products and the catalysts have had relatively long lives. However, while these catalysts give very good results, they have had the objectionable property of degrading a substantial amount of the feed material to gaseous hydrocarbons and to carbonaceous, coke-like material which was laid down on the catalyst, necessitating frequent regeneration in a combustion operation to remove the coke-like deposits. Deposition of carbon on the catalyst is not only disadvantageous from the standpoint of degradation of useful products to material of practically no value, but the combustion operation in which the catalyst is regenerated results after a period of time in substantial damage to the catalyst, the catalyst in the form of pills or pellets usually losing its mechanical strength and disintegrating.

The present invention involves the steps of passing a feed stock comprising paraffinic hydrocarbons, naphthenic hydrocarbons or a mixture of them at a temperature within the range of 800° to 1300° F. and at a pressure within the range of atmospheric to 500 p. s. i. over a catalyst comprising a molybdate of a metal selected from the left-hand column of group II of the periodic table and a catalyst support such as alumina, magnesia or zirconia in the presence of a promotional amount of a metal selected from the oxides, hydroxides and salts of potassium. Hydrogen may be present or absent, depending on the type of reaction taking place. For example, if the feed stock comprises naphthenes and it is desired to dehydrogenate the naphthenes or hydroform them to aromatics, hydrogen should be present. Under these conditions the feed stock is converted to aromatic hydrocarbons through an aromatization and/or hydroforming process, depending on the compounds present in the feed material.

In the practice of the present invention, the temperature should be in the range from about 800° to 1300° F. with a preferred range from about 1000° to about 1200° F. Pressures may range from atmospheric in the case where paraffins are converted to aromatics up to about 200 pounds; in the case where naphthenes are hydroformed to aromatics, pressures may preferably range from about 100 to about 300 pounds per square inch.

The promoter employed in the present invention is a compound of potassium, such as the oxide, hydroxide or a salt thereof. As specific examples of suitable salts may be mentioned potassium fluoride, potassium carbonate, and potassium nitrate.

The amount of promoter material employed in the catalyst used in the present invention will comprise promotional quantities in the range from about 0.1 to 10% by weight of the catalyst. A preferred range is 0.1 to 1.5% by weight of the catalyst composition. Ordinarily the promoter may be added as a solution of a salt or a solution of the oxide or hydroxide of potassium.

The supporting material employed in the practice of the present invention may comprise substantially pure alumina, but may also include aluminum oxide which contains a substantial amount of silicon dioxide. For example, the alumina may contain as much as 80% of silicon dioxide, but preferably should contain no more than 5% of silicon dioxide. The zirconia and magnesia are preferably used in substantially purified form, but may contain substantial amounts of materials usually associated with zirconia and magnesia. Mixtures of alumina, magnesia, and zirconia may be employed as supporting material. Alumina in the form of gamma alumina is the preferred support.

The amount of the molybdate of the group II metals employed in the practice of the present invention may vary from about 10 to about 50 weight per cent of the catalyst. Good results are obtained where the molybdate comprises between 20 and 30% by weight of the composition with the remainder being the support and promoter.

As illustrative of the molybdates finding employment in the practice of the present invention may be mentioned calcium molybdate, magnesium molybdate, and beryllium molybdate. Barium and strontium molybdates may be employed under some conditions, but the calcium molybdate, magnesium molybdate, and beryllium molybdate will be preferred.

The hydrocarbon feed which may be employed in the present invention, as mentioned before, may be a paraffinic hydrocarbon or a naphthenic hydrocarbon or a mixture of them. The hydrocarbon may be employed in a substantially pure state. For example, if a paraffinic hydrocarbon is to be converted to aromatics, paraffins such as an n-hexane, n-heptane, n-octane, n-nonane, and the like may be the feed stock or a fraction containing any of them or isomers thereof in substantial quantities may be used. If the feed stock is a naphthenic hydrocarbon and it is to be converted to an aromatic hydrocarbon in our invention, the feed may be dimethyl cyclopentanes, cyclohexane, methyl cyclohexane, and other members of the same homologous series. Feed stocks finding usage in the present invention may include petroleum distillates containing either or both of these types of compounds. Such fractions may boil in the range between about 200° and 350° F. Higher boiling fractions containing paraffins and naphthenes may also be used, but fractions in the gasoline boiling range containing paraffins and naphthenes are to be preferred. The term "saturated hydrocarbon" is intended to embrace both paraffinic and naphthenic hydrocarbons; it is understood that the feed stock to be converted may, in addition to paraffins and/or naphthenes, also contain aromatic hydrocarbons. These will, as a rule, pass through the reaction zone substantially unchanged. Small amounts of other compounds, such as nitrogen or sulfur compound, olefins, and others frequently met in petroleum distillates, may also be present in the feed stock.

As illustrative of the type of feed stock finding use in the present invention, inspection characteristics of three fractions are given in Table I below. The fraction in the first column of the table is substantially pure normal heptane while the fraction in the second or middle column is a crude petroleum distillate and the fraction in the third and last column is a solvent raffinate of a toluene fraction. It will be seen from the characteristics of the fractions given in Table I that none of them contains an appreciable quantity of aromatic hydrocarbons.

TABLE I

| Feed Stock | Normal Heptane | Naphtha | Solvent Raffinate |
|---|---|---|---|
| Gravity, ° OPI | 73.8 | 53.9 | 61.6 |
| ASTM Disillation: | | | |
| IBP, ° F | 204 | 236 | 216 |
| FBP, ° F | 222 | 320 | 297 |
| 5% off at, ° F | 206 | 245 | 219 |
| 10% | 206 | 247 | 220 |
| 20% | 206 | 250 | 221 |
| 30% | 206 | 254 | 223 |
| 40% | 206 | 259 | 224 |
| 50% | 206 | 263 | 226 |
| 60% | 207 | 267 | 228 |
| 70% | 207 | 273 | 230 |
| 80% | 207 | 280 | 236 |
| 90% | 207 | 290 | 245 |
| 95% | 207 | 300 | 254 |
| Recovery | 98.0 | 98.0 | 98.0 |
| Residue | 0.8 | 1.0 | |
| Loss | 1.2 | 1.0 | |
| Aromatics Content Vol. Percent: | | | |
| Benzene | | 0 | 0 |
| Toluene | | 3.9 | 1.3 |
| Xylenes and Ethylbenzene | | 7.8 | 0.6 |
| C$_9$ Aromatics | | 2.3 | 0.2 |
| Total | | 14.0 | 2.1 |

The present invention will be further illustrated by the following examples.

*Example I*

800 parts of alumina containing approximately 5% by weight of silica, 236 parts of Ca(NO$_3$)$_2$·4 H$_2$O and 1200 parts of distilled water were thoroughly mixed in a jar mill. The resulting mixture was then dried in a mechanical convection oven in the presence of air for approximately 18 hours. The dried material was then divided into two portions in the weight ratio of 1:2, designated, respectively, as portions A and B.

To portion A was added an aqueous solution of 58.3 parts of ammonium molybdate (82.37% MoO$_3$) and 7.7 parts of potassium carbonate in 330 liquid volumes of concentrated ammonium hydroxide solution. After thoroughly mixing these components in a jar mill, the mixture was dried in a mechanical convection oven for 17 hours and the dried material was formed into $\frac{3}{16}$" tablets and heated in an electric muffle furnace in the presence of air as follows: The catalyst was placed in the cold furnace and was heated rapidly to 400° F. and maintained at this temperature for 30 minutes. The temperature was then increased 100° F. every 15 minutes until a temperature of 700° F. was obtained; at this point the temperature was increased to 1000° F. as rapidly as possible and was maintained at this level for three hours.

To portion B was added 116.5 parts of ammonium molybdate dissolved in 570 liquid volumes of concentrated ammonium hydroxide solution and the resulting mixture was thoroughly mixed in a jar mill. The homogeneous, creamy mixture obtained from the jar mill was then dried in a mechanical convection oven for 17 hours. After drying, the catalyst was formed into 1/8" tablets and heated as described in the time-temperature pattern for portion A.

It will be seen that portion A contains potassium carbonate and portion B did not contain any potassium carbonate. In short, one was promoted and the other unpromoted. The composition of the catalyst prepared in the foregoing manner was approximately 20% calcium molybdate and 80% alumina. The portion containing potassium carbonate contained potassium in an amount of approximately 1.3% potassium carbonate.

The two portions of catalyst prepared in the foregoing manner were then contacted with the normal heptane fraction given in Table I, at a temperature of 1000° F. and under gauge pressures of 0 and 50 pounds per square inch gauge, respectively. In one instance, hydrogen was employed in the amount of 20 mols of hydrogen per mol of normal heptane. In the other instance hydrogen was absent. In all runs the reaction cycle length was three hours, following which the catalyst was submitted to a regeneration operation to remove carbon which has been laid down on the catalyst.

The results of these runs are given in Table II.

TABLE II

| Run No. | 1 | 2 | 3 | 4 |
|---|---|---|---|---|
| Feed Stock | (¹) | (¹) | (¹) | (¹) |
| Feed Rate, V./V./Hr. | 1.1 | 1.1 | 1.1 | 1.1 |
| Mols H₂ per Mol nC₇ | 2 | 2 | | |
| Reaction Cycle Length, Hrs. | 3 | 3 | 3 | 3 |
| Reaction Temperature, °F. | 1,000 | 1,000 | 1,000 | 1,000 |
| Reactor Pressure, p. s. i. g. | 50 | 50 | 0 | 0 |
| Catalyst Promoter | None | (²) | None | (²) |
| Conversion of Feed, Percent | 52 | 49 | 43 | 47 |
| Carbon, Wt. Percent of Feed | 1.9 | 0.1 | 3.5 | 1.1 |
| Liquid Product, Vol. Percent of Feed | 67 | 76 | 78 | 80 |
| Olefins, Vol. Percent of Feed | 7 | 8 | 6 | 5 |
| Aromatics, Vol. Percent of Feed | 10 | 16 | 13 | 20 |
| Selectivity to Aromatics, Percent | 27 | 45 | 40 | 60 |

¹ Normal heptane.
² 1.3% K (as K₂CO₃).

It will be seen from Table II that in runs 1 and 2 hydrogen and pressure were employed in both cases, and in one case the catalyst was portion A and in the other case was portion B, the portion A being the catalyst containing the promoter. In runs 3 and 4, it will be seen that hydrogen was absent and the reaction pressure was 0 pounds per square inch gauge. It is interesting to note that comparatively much less carbon was produced in the runs where promoter was present, the runs with the unpromoted catalyst producing the most carbon whereas the promoted catalyst, especially at a pressure of 50 pounds per square inch gauge, produced substantially no carbon. The promoter in both cases increased the selectivity and the yield of aromatics with or without the application of hydrogen.

*Example II*

In this example, a catalyst comprising 20% calcium molybdate and 80% alumina to which had been added 1.3% of potassium as potassium carbonate was employed. In one instance the naphtha feed from the petroleum distillate shown in Table I was employed and in another instance the solvent raffinate, also presented in Table I, was employed in contact with the catalyst mentioned. The conditions of the run and the characteristics and yields of product are given in the following table:

TABLE III

| | Naphtha | Solvent Raffinate |
|---|---|---|
| Operating Conditions: | | |
| Cycle Length, Hours | 3 | 3 |
| Feed Rate, V./V./Hr. | 0.5 | 0.5 |
| Pressure, p. s. i. g. | 50 | 50 |
| Temperature, °F. | 1,000 | 951 |
| Feed: | | |
| Liquid, Vols. at 60° F. | 284 | 264 |
| H₂, cu. ft. at standard temp. and pressure | 3.11 | 3.11 |
| Weight Percent Recovery | 96.5 | 104.0 |
| Yields, Based on Feed: | | |
| Total Aromatics, Vol. Percent | 41.8 | 26.2 |
| Liquid, Vol. Percent | 70.1 | 76.8 |
| Carbon, Wt. Percent | 1.8 | 1.1 |
| Conversion of Feed, Percent | 65 | 56 |
| Selectivity, Percent to: Aromatics | 49 | 50 |

It will be seen from the foregoing data in Table III that substantial conversion of the paraffins to aromatics has been made with only small amounts of carbon being laid down on the catalyst. In runs with the naphtha at lower temperatures of 944° and 923° F., much lower amounts of carbon in the neighborhood of 0.5 weight per cent were formed, indicating that with this naphtha 1000° F. may be too high a temperature to be employed. A similar effect was obtained with the solvent raffinate at approximately the same temperature at a higher feed rate and with double the amount of hydrogen. Instead of 1.1% by weight of carbon being obtained as shown in the foregoing table, the run at the higher feed rate and the greater amount of hydrogen resulted in only 0.3 weight per cent of carbon being laid down on the catalyst.

From the foregoing description of the invention and the examples, it will be seen that the present invention is susceptible to many variations and modifications. The catalyst employed may be used on various supporting materials and yet give good results. Also, hydrogen may be employed or dispensed with depending on the type of feed stock and also on the conditions employed in the reaction.

It will be understood that the aromatic hydrocarbons produced in the present invention will not ordinarily be in a purified form and that the product when it is removed from contact with the catalyst will have to be given further treatment to recover the valuable aromatics therefrom. For example, the product may be subjected to azeotropic or extractive distillation or to solvent extraction with any of the well known solvents having the ability to separate predominately aromatic from predominately non-aromatic constituents. Such solvents which may be used in the solvent extraction or in the extractive distillation may include phenol, sulfur dioxide, aniline, nitrobenzene and others too numerous to mention here which are well known to the art.

In practicing our invention, as mentioned before, in operations of this type it is conventional to employ the catalyst disposed in a fixed bed. When the catalyst is disposed in a fixed bed, it may be employed as pills, tablets, or pellets. Under such operation, it is usually desirable to conduct the reaction under alternate reaction and regeneration cycles with the reaction cycle being followed by the regeneration cycle and after the catalyst has been regenerated employed again in the reaction cycle. Such techniques are well known and do not necessarily form a part of our invention. It is customary in the prior art to preheat the regenerated catalyst with hydrogen. This pretreatment may be employed in the practice of our invention or may be dispensed with at the option of the operator. Ordinarily, pretreatment may be used since it may exert a beneficial result. However, observation of the catalyst indicated that pretreatment with hydrogen or reducing gases exerts no observable physical or chemical effect on the catalyst. Thus, under some conditions it may be desirable to dispense with the pretreatment operation.

The invention is especially adapted to employment with the so-called fluidized powder technique in which the hydrocarbons being reacted have the catalytic material suspended in them. When the fluidized powder technique is employed, the catalyst may be in a finely divided condition having particle diameters in the range from 20 to about 200 microns with a preponderance of the catalyst having diameters in the range from 20 to 100 microns. When a fluidized powder technique is employed, the catalyst may be suspended in the vaporized or partially vaporized hydrocarbons and then reacted in a reaction zone where the velocity of the suspension is adjusted to form a dense phase or bed. Products of the reaction are separated from the catalyst, and the catalyst is subjected to a combustion or regeneration operation in a dense bed in a regeneration zone. The techniques of the fluidized powder operation are well known. An operation of this type is disclosed in U. S. Patent No. 2,447,043, issued August 17, 1948, to Albert B. Welty, et al. The catalyst employed by Welty et al. comprises a support such as zinc aluminate spinel and, as active components, an oxide of a metal selected from the group consisting of molybdenum, chromium, and tungsten, combined with calcium oxide. The advantages of the catalyst disclosed by Welty et al. over conventional catalysts in the "fluidized" hydroforming process will also accrue to the improved catalyst of the present invention, wherein promoted Group II metal molybdates on a support therefor are employed as catalysts.

The nature and objects of the present invention having been completely described and illustrated, what we wish to claim as new and useful and to secure by Letters Patent is:

1. A supported catalyst composition consisting of a molybdate of a metal selected from the left-hand column of group II of the periodic table to which has been added a promotional quantity in the range between about 0.1% and 10% by weight of the supported catalyst of a compound selected from the group consisting of the oxide, hydroxide and inorganic salts of potassium.

2. A composition in accordance with claim 1 in which the molybdate is calcium molybdate.

3. A composition in accordance with claim 1 in which the molybdate is magnesium molybdate.

4. A composition in accordance with claim 1 in which the molybdate is beryllium molybdate.

5. A catalyst composition consisting of 10% to 50% by weight of a molybdate of a metal selected from the left-hand column of group II of the periodic table, 0.1% to 10% by weight of a promoter selected from the group consisting of the oxide, hydroxide and inorganic salts of potassium and the remainder alumina.

6. A composition in accordance with claim 5 in which the molybdate is calcium molybdate.

7. A composition in accordance with claim 5 in which the molybdate is magnesium molybdate.

8. A composition in accordance with claim 5 in which the molybdate is beryllium molybdate.

9. A catalyst composition which consists of calcium molybdate and alumina in the ratio of 1:4 and 1.3% by weight potassium carbonate.

10. A catalyst composition consisting of calcium molybdate and alumina in the ratio of 1:4 to which has been added 1.3% potassium as potassium carbonate.

JAMES A. DINWIDDIE.
CHARLES J. G. LEESEMANN.

REFERENCES CITED

The following references are of record in the file of this patent:

UNITED STATES PATENTS

| Number | Name | Date |
|---|---|---|
| 2,271,751 | Visser et al. | Feb. 3, 1942 |
| 2,378,209 | Fuller et al. | June 12, 1945 |
| 2,447,043 | Welty et al. | Aug. 17, 1948 |
| 2,474,440 | Smith et al. | June 28, 1949 |